July 15, 1941.    E. C. ROGERS    2,249,229
FOCUS ADJUSTER FOR ENLARGERS
Filed Feb. 17, 1940
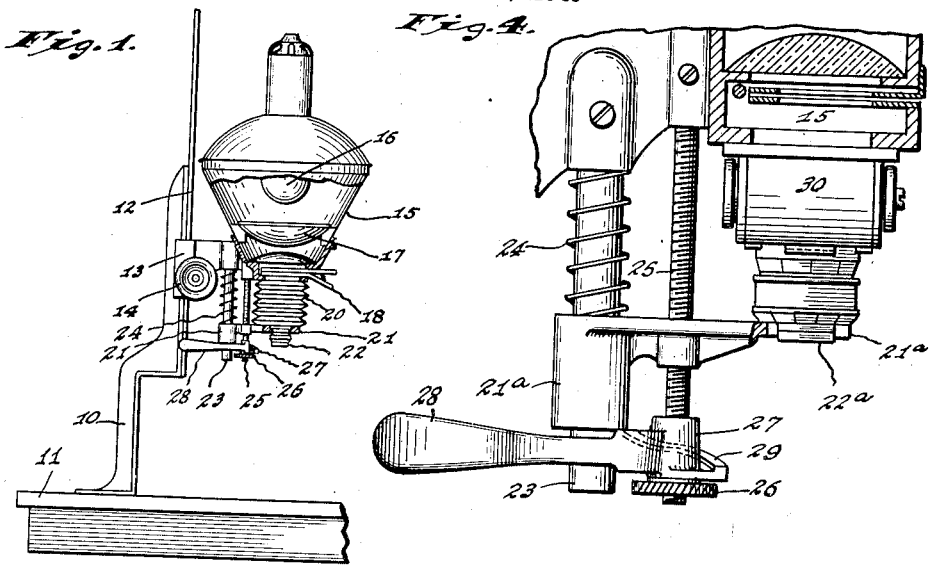
INVENTOR.
ELWOOD C. ROGERS,
BY
ATTORNEYS.

Patented July 15, 1941

2,249,229

UNITED STATES PATENT OFFICE 2,249,229

FOCUS ADJUSTER FOR ENLARGERS

Elwood C. Rogers, Indianapolis, Ind.

Application February 17, 1940, Serial No. 319,420

12 Claims. (Cl. 88—24)

My invention relates to focus adjusters for lenses, especially of photographic enlargers, and particularly to focus adjusters intended to be forcused manually by the operator.

In focusing an enlarger, it is necessary for the operator to adjust the focusing mechanism while watching the enlarged image, and to judge by the appearance of such image when the proper focus has been obtained. As the image approaches exact focus, however, the changes produced by further adjustment of the focusing mechanism toward exact focus become so slight that it is difficult for the operator to discern those changes. For final adjustment, therefore, it is usual practice to move the lens back and forth across the point of exact focus to observe the changes thus produced and to judge from those changes where the point of exact focus is, and then to move the lens to the position judged to be the point of exact focus.

It is the object of my invention to provide a focusing mechanism which may be adjusted to bring the lens to approximate focus, and which has an adjusting device particularly suitable for the final focusing operation, and to arrange this latter device so that the final operation may be done rapidly and accurately at any point within a fairly wide range from the setting for approximate focus. It is my further object to provide a focusing mechanism which may be used either for adjusting a lens which is a special lens forming part of a photographic enlarger or for adjusting a lens of a so-called "miniature" camera which may be mounted in the enlarger to become part thereof if desired. A further object of my invention is to arrange the parts of the adjusting mechanism to secure freedom of movement, especially throughout the final adjustment, and to avoid any tendency for the lens-carrying parts to become misalined during the focusing adjustment.

In accordance with my invention, I may provide an enlarger with a vertically depending stem on which a slide is vertically movable; and this slide carries the lens which is to be adjusted, whether it is a lens specially mounted for use as part of the enlarger or is a lens of a miniature camera which may be mounted on the enlarger. This slide may be given an approximate adjustment upward or downward by a nut on a vertical screw; and may be given a final adjustment upward or downward by a cam member which rests on the nut and which has a helical cam that reacts against the slide, desirably at a point close to the stem on which the slide is movable, and that may be operated accurately and conveniently by a projecting arm of considerable length.

The accompanying drawing illustrates my invention. In such drawing Fig. 1 is a side elevation of a photographic enlarger equipped with my focus adjuster, with some of the parts in section; Fig. 2 is an enlargement of part of Fig. 1, showing the adjusting mechanism on a larger scale; Fig. 3 is a section on the line 3—3 of Fig. 2; and Fig. 4 is a view similar to Fig. 2 but showing the focusing mechanism in use with the lens-carrying portion of a miniature camera mounted on the enlarger.

The photographic enlarger shown has an upright 10 mounted on a table 11 and provided with a vertical slideway 12 on which is mounted a main slide member 13 which carries the main body of the enlarger. The slide member 13 may be clamped in any desired place on the slideway 12 by a clamping screw 14. The outer end of the main slide member 13 carries the enlarger casing 15 in which is mounted a lamp bulb 16 and a negative carrier 18, and may carry any suitable condensing lenses 17. This whole mechanism moves upward and downward with the main slide member 13.

From the lower end of the enlarger casing 15 a camera bellows 20 extends downward, to an adjusting slide 21 which carries the objective lens 22. The adjusting slide 21 is vertically slidable on a stem or rod 23 extending vertically downward from the main slide member 13, and it is desirably pressed downward on that rod 23 by a light spring 24. The adjusting slide 21 is held from turning on the rod 23 by a screw 25 which also extends downward from the main slide member 13 and passes through a hole in the adjusting slide 21.

Below the adjusting slide 21, the screw 25 has mounted on it a knurled nut 26, on which rests a cam member 27. The cam member 27 has a relatively long laterally extending operating handle 28, which has a considerable leverage so that such handle moves a considerably greater distance than the cam surface of said cam member 27. The cam member 27 is provided on its upper face with a helical cam surface 29, which extends for something like one-half a turn; and the hub of the adjusting slide 21 rests on this cam surface 29. The pitch of the cam surface is such that the camming mechanism is irreversible, although it is desirably sufficient to give a considerable movement to the hub during movement of the cam member.

In operation, the approximate adjustment of the adjusting slide 21, and therefore of the objective lens 22, is obtained by adjusting the knurled nut 26; which by its rotation, and its consequent travel along the screw 25 to a desired position locates the cam 27 bodily at a desired point on that screw 25, and thus locates the adjusting slide 21 which rests on the cam surface 29. The nut 26 is desirably relatively large and heavy, so that in practice the adjusting slide 21 and cam member 27 may be lifted and the nut 26 spun to cause it to rapidly travel either upward or downward on the screw 25 to approximately the desired position for focus of the objective lens. The slide 21 and cam member 27 are then rested on the nut 26 and the final adjustment may be obtained by manipulating the handle 28, to raise and lower the hub of the adjusting slide 21 quickly and under accurate control. The spring 24 assists gravity in keeping the hub of the adjusting slide 21 seated on the cam surface 29; and the cam surface reacts directly on the hub close to the rod 23 so that its reaction has no effective tendency to cock the slide on the rod or rotate the slide about the rod.

In the construction which has just been described, the bellows 20 is permanently attached at its upper end to the enlarger casing 15 and at its lower end to the adjusting slide 21; and the lens 22 is mounted in that adjusting slide. However, if desired, the adjusting slide may be made with a forked end 21a, to adapt it to support the lens-carrying portion of a miniature camera.

One form of miniature camera has a case which is open at the back, a removable back for closing the case, and an extensible lens carrier spring pressed to extended position. The lens is mounted in a sleeve projecting forward from a collar at the front of the lens carrier.

The forked end 21a is adapted to fit around the sleeve of the lens 22a of the miniature camera and to bear against its surrounding collar. The adjusting slide with the forked end 21a may thus be used to hold the camera case 30 upwardly against the lower face of the enlarger casing 15, by moving the slide upwardly against the collar to within the range of extension of the camera lens-carrier. The lens 22a is then held in position to act as the objective lens of the enlarger, and may be adjusted for focus by movement of the adjusting slide within the range of compression and extension of the spring-pressed lens-carrier.

The adjustment of the adjusting slide with the forked end 21a is accomplished in the same way as the adjustment already described for adjusting the adjusting slide 21, by manipulation of the nut 26 and the cam 27.

I claim as my invention:

1. A focus adjuster for photographic enlargers, comprising, in combination with the enlarger casing, an adjustable member movable with respect to said casing and controlling the position of the objective lens of the enlarger relatively to the casing, adjusting means for said member, and a cam member interposed between said adjusting means and said member and movable to adjust said member with respect to said adjusting means.

2. A focus adjuster for photographic enlargers, comprising, in combination with the enlarger casing, an adjustable member movable with respect to said casing and controlling the position of the objective lens of the enlarger relatively to the casing, adjusting means for said member, and a cam member interposed between said adjusting means and said member and movable about an axis parallel with the axis of the objective lens to adjust said member with respect to said adjusting means.

3. A focus adjuster for photographic enlargers, comprising, in combination with the enlarger casing, an adjustable slide movable with respect to said casing and controlling the position of the objective lens of the enlarger relatively to the casing, spring means urging the slide in one direction relative to the casing, an adjusting device adjustably movable in a direction parallel to the direction of movement of said slide, and a cam member supported against said adjusting device and reacting against said slide in opposition to said spring means, and means for moving said cam member to adjust said slide through a limited range with respect to said adjusting device.

4. A focus adjuster as defined in claim 1, with the addition of a handle by which the cam member is movable and which has a considerable leverage on said cam.

5. A focus adjuster as defined in claim 3, with the addition of a handle by which the cam member is movable and which has a considerable leverage on said cam member.

6. A focus adjuster for photographic enlargers, comprising, in combination with the enlarger casing, a depending rod fixed with relation to said casing, an adjusting slide vertically movable on such rod and controlling the position of the objective lens of the enlarger, a second rod fixed with relation to said casing and parallel with said first rod and guiding said slide against rotation about said first rod, an adjusting device associated with said second rod for adjusting the position of said slide, and a cam member interposed between said adjusting device and said slide and movable to adjust the slide with respect to said device.

7. A focus adjuster for photographic enlargers, comprising, in combination with the enlarger casing, a rod fixed with relation to said casing, an adjusting slide movable on such rod and controlling the position of the objective lens of the enlarger, a spring on said rod and tending to move said adjusting slide along said rod, a second rod fixed with relation to said casing and parallel with said first rod and guiding said slide against rotation about said first rod, an adjusting device associated with said second rod for adjusting the position of said slide, and a cam member interposed between said adjusting device and said slide and movable to adjust the slide with respect to said device, said cam member being arranged to act against said slide at a point close to said first rod whereby the action of said cam member is substantially directly opposed to the action of said spring.

8. A focus adjuster for photographic enlargers, comprising, in combination with the enlarger casing, a rod fixed with relation to said casing, an adjusting slide movable on such rod and controlling the position of the objective lens of the enlarger, a spring tending to move said adjusting slide along said rod, a screw mechanism having a member movable with respect to said rod, and a cam member mounted on said movable member of said screw mechanism and engaging said adjusting slide and movable to obtain rapid and accurately controlled adjustments of said adjusting slide with respect to said movable member.

9. A focus adjuster for photographic enlargers, comprising, in combination with the enlarger casing, a depending rod fixed with relation to said casing, an adjusting slide vertically movable on such rod and controlling the position of the objective lens of the enlarger, a screw mechanism having a member vertically movable with respect to said rod, and a cam member mounted on said vertically movable member of said screw mechanism and engaging said adjusting slide and movable to obtain rapid and accurately controlled adjustments of said adjusting slide with respect to said vertically movable member.

10. A focus adjuster for photographic enlargers, comprising, in combination with the enlarger casing, a depending rod fixed with relation to said casing, an adjusting slide vertically movable on such rod and controlling the position of the objective lens of the enlarger, a screw mechanism having a member vertically movable with respect to said rod, and a cam member mounted on said vertically movable member of said screw mechanism and engaging said adjusting slide and movable to obtain rapid and accurately controlled adjustments of said adjusting slide with respect to said vertically movable member, the cam surface of said cam being in the form of a helix.

11. A focus adjuster as defined in claim 9 with the addition of a handle by which the cam member is movable and which has a considerable leverage on said cam-member.

12. A focus adjuster for photographic enlargers, comprising in combination with the enlarger casing, a lens-carrier supporting the objective lens of the enlarger and movable toward and away from the enlarger casing, a reaction member, a cam member operable between said lens-carrier and said reaction member to move said lens carrier through a limited range of adjustment relatively to the reaction member, means for adjusting the reaction member toward and away from the enlarger casing, and an operating handle for said cam member and having a considerable leverage on said cam member.

ELWOOD C. ROGERS.